UNITED STATES PATENT OFFICE.

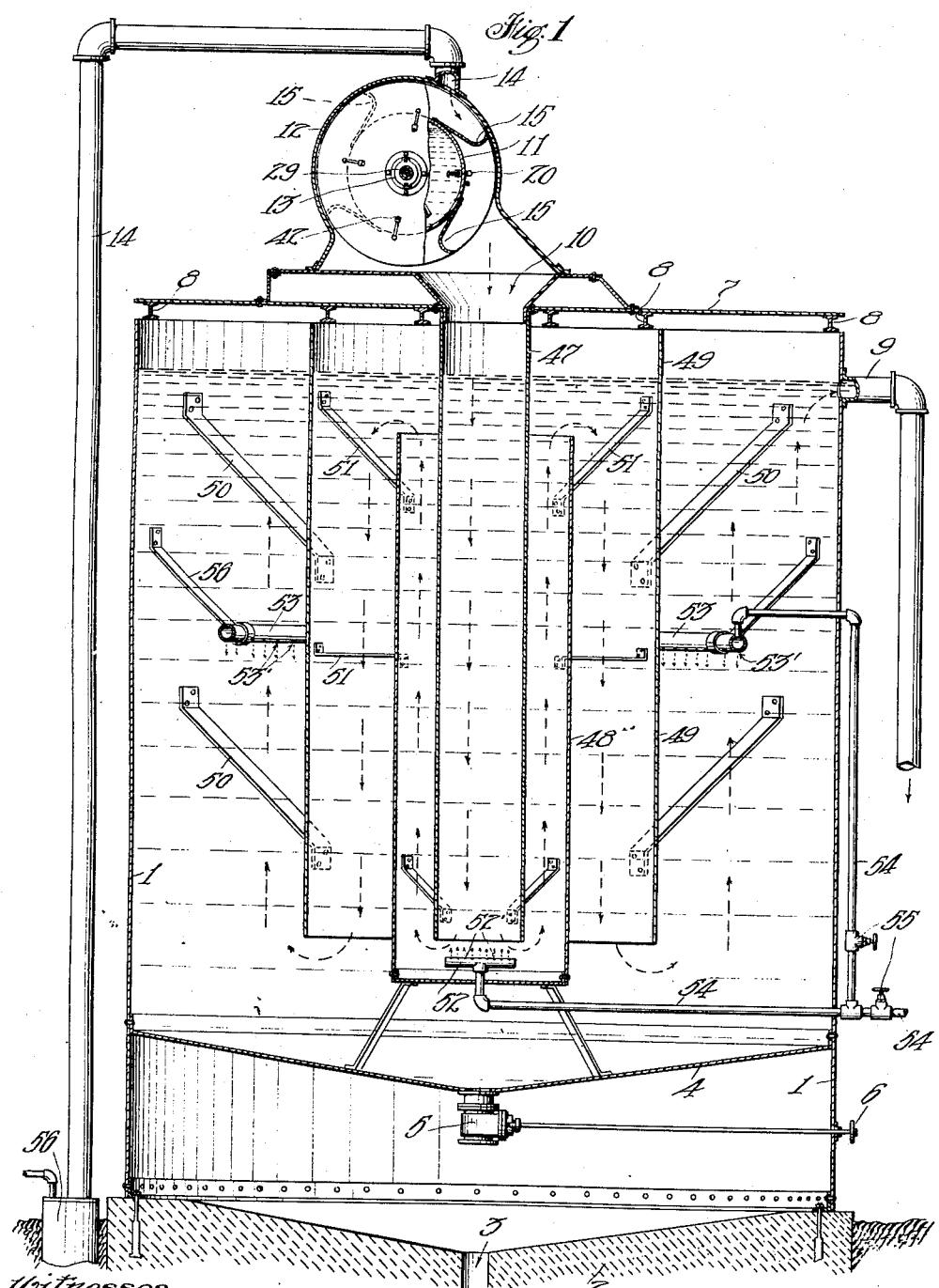

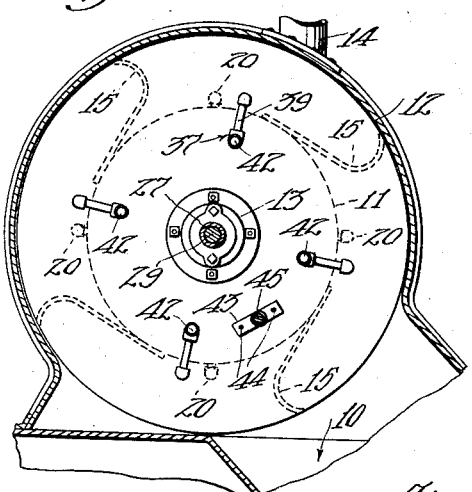
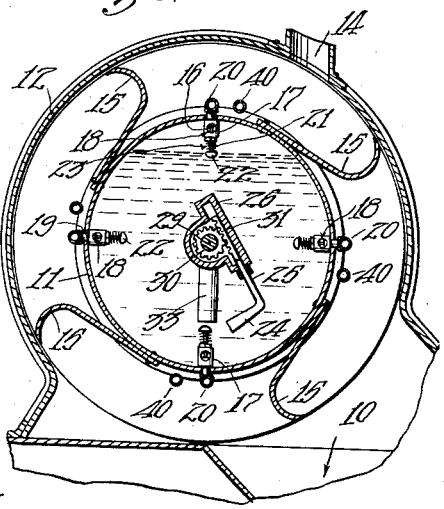
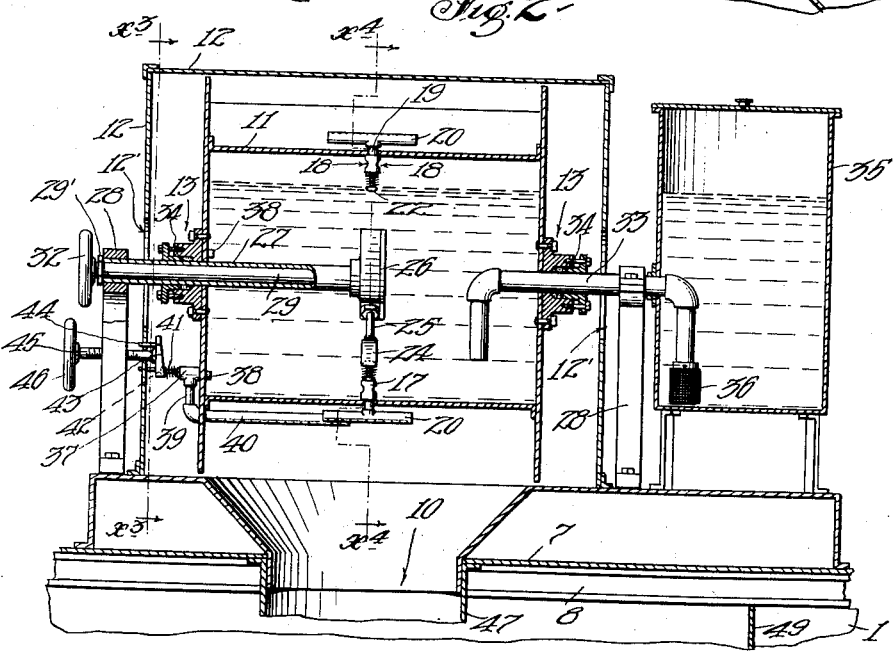

JOHN L. ZEIGLER, OF LOS ANGELES, CALIFORNIA, ASSIGNOR OF ONE THIRD TO JOSEPH REED AND ONE-THIRD TO F. G. CALKINS, OF LOS ANGELES, CALIFORNIA.

WATER SOFTENING AND CLARIFYING APPARATUS.

No. 830,552.  Specification of Letters Patent.  Patented Sept. 11, 1906.

Application filed March 1, 1906. Serial No. 303,587.

*To all whom it may concern:*

Be it known that I, JOHN L. ZEIGLER, a citizen of the United States, residing at Los Angeles, in the county of Los Angeles and State of California, have invented a new and useful Water Softening and Clarifying Apparatus, of which the following is a specification.

The main object of this invention is to provide improved means for rapidly and economically treating hard water to soften and clarify the same.

The invention comprises means for automatically and continuously supplying to the water to be treated reagents in proper quantities for the softening of the same, means for effectual distribution of the reagents in the water, and means for clarifying or settling out the precipitates from the water.

The accompanying drawings illustrate the invention.

Figure 1 is a vertical section of the apparatus. Fig. 2 is a longitudinal section of a portion of the feeding means for regulating the supply of liquids. Fig. 3 is a section on line $x^3 x^3$, Fig. 2. Fig. 4 is a section on line $x^4 x^4$, Fig. 2. Fig. 5 is an end elevation showing the operating devices for the feed-valves.

1 designates a casing, shell, or tank which may rest on a foundation or floor 2, said floor being inclined to drain to an outlet 3. A false floor 4, extending across said shell 1, forms the bottom of the water treating and settling tank and is provided with a draw-off valve 5, whose operating-handle means 6 extends to the outside of the casing, said valve discharging into the pit or space below the bottom 4 and onto the floor 2. The casing or tank 1 is open at the top, a top plate 7 extending from said casing and being supported by beams 8, so as to leave an open space between said plate and the top of the walls of the tank. An outlet-pipe 9 for the tank leads from near the top of a side wall thereof, and the inlet 10 of the tank is located centrally of the tank. Means are provided for supplying to said inlet regular and proportionate quantities of water to be treated and softening reagent therefor. Said means comprises an automatic feeder and rotary water-measuring device actuated by the influx of the water and consisting of a drum 11, mounted to rotate on journal members 27 33, mounted in bearings 13 on the drum, the said casing connected at the top with an inlet-pipe 14 to receive the incoming water supplied by a pump or well 56, and said casing opening at the bottom into the inlet 10 of the main tank, and the said drum 11, having buckets 15, extending in the space between the drum and the casing in such manner as to receive the impact of the water as it passes from the inlet 14 to the inlet 10, thereby causing rotation of the member 11. The space within the drum 11 constitutes a chamber for the reception of the softening solution or reagents, and the member 11 is provided with valves 16, opened automatically, to permit discharge of the reagents at certain times in the rotation of the drum 11. Each valve 16 is mounted to slide radially in a tubular casing 17, mounted on the peripheral wall of the drum 11, said casing having ports 18, which are opened when the valve moves outwardly to establish communication from the interior of the drum through said ports and the valve and through a radial outlet-pipe 19 and a nozzle or spray-pipe 20 to the space outside of the drum. Each valve 16 has a spindle 21, a head 22 thereon, and a spring 23 between said head and the valve-casing to hold the valve inwardly in closed position. The several heads 22 of the respective valves are arranged in circular order, and an operating arm or device 24 is provided in the path of said valve-heads to operate the same. Said operating-arm is adjustable, being mounted on a bar 25, sliding in a frame 26 on the inner end of a fixed sleeve 27, extending from a fixed bracket or support 28 axially of the drum 11, and an operating-spindle 29 extends axially in said sleeve, carrying at its inner end a pinion 30, engaging a rack 31 on slide-bar 25, and the outer end of said spindle carrying outside of the casing 12 an operating hand-wheel 32, so that by turning said hand-wheel the arm 24 can be projected or retracted in a radial direction to vary or differentiate the action of the said arm on the valves, thereby controlling the amount of fluid discharged at each operation.

29' designates a lock-nut on spindle 29 to hold the pinion to set position. The sleeve 27 forms a bearing for the drum 11 at one end thereof, and the bearing at the other end may be formed by the reagent-inlet pipe 33, both of said bearings being provided with stuffing-boxes 34.

35 designates a tank containing the solution or softening reagents, the inlet-pipe 33 leading from the lower part of said tank and being provided at its intake 36 with a strainer 36.

Supplementary or alternatively to the above-described valve devices valves 37 may be provided, communicating at 38 with the chamber within the drum 11 and communicating by pipe 39 with a discharge or spray-nozzle pipe 40, each of said valves 37 having a closure-spring 41 and a head 42. The operating means for said valves consists of an inclined block 43, mounted to slide by pins 44 in the end wall of casing 12 and moved inwardly or outwardly by a screw 45, operated by a hand-wheel 46. Casing 12 has an opening 12' at one end for exit of air.

From the inlet 10 a pipe 47 extends downwardly from the top plate 7 toward the bottom 4 of the tank, said pipe being open at the bottom and discharging into a riser or uptake pipe 48, closed at the bottom and extending up around the pipe 47 to near the top of the tank, terminating somewhat below the level of the overflow or outlet 9. Another downflow or downtake pipe 49 extends downwardly from the top of the tank around the pipe 48 toward the bottom of the tank. The pipe 49 is supported by braces or arms 50, extending from the walls of the tank 1, and other braces or arms 51 extend from the pipe 49 to the pipe 48 to support the latter. There is a continuous increase in cross-section of the successive pipes 47 48 49, and the space between the pipe 49 and the tank 1 is of still larger cross-section, so that there will be a gradual slackening of the speed of the water as it passes through the system.

52 designates an air-supply nozzle directly under the intake-pipe 47, said nozzle being provided with perforations 52' for directing air upwardly into said pipe, and 53 designates an air supply or nozzle pipe located in the tank 1 around the outermost pipe 49 and provided with perforations 53', directed downwardly through its bottom. An air-supply pipe 54 communicates with the respective discharge-pipes 52 53 and is provided with valves 55 to control the air-supply.

56 designates brackets or arms supporting the air-discharge pipe 53 from the wall of the casing 1.

The operation is as follows: The reagent-tank 35 is charged with solution containing the precipitating or softening reagents—for example, soda ash and lime—in proper proportions, according to the analysis of the water to be treated. From said tank the said reagents flow through pipe 33 into the chamber within the drum 11, and the water flows from well or pump 56, through pipe 14, and discharges on the buckets 15, thereby rotating the drum 11 at a speed proportionate to the amount of water introduced, this device operating, in fact, as a measuring device for the water-supply. In the rotation of the drum 11 the heads 22 on the valve-stems successively strike the fixed arm 24, with the result that as each valve comes into position at the lower part of the drum it is opened by said arm and discharges a certain quantity of reagent fluid into the inlet 10, this discharge being effected through the spray-nozzle 20, so as to distribute the same more evenly, the movement of the nozzle in rotation of the drum also aiding in the even distribution. The position of the arm 4 may be adjusted to control the amount of reagent so introduced according to the analysis of the water or according to the variation of analysis thereof from time to time. The valves 37 may be normally rendered inoperative by turning out the handles 46 and may be thrown into operation if for any cause the supply by the valves 16 is insufficient, or in case of a smaller delivery of water the valves 16 may be thrown out of operation and the valves 37 alone used. Each charge of reagent solution passes into the inlet 10 along with raw water passing from the buckets of the drum 11, the discharge-nozzle 20 being located within the bucket-space, so that introduction of the raw water and reagent to the central intake of the main tank is simultaneous. Valve 55 is opened and compressed air enters the pipe 54 and discharges through nozzle-pipe 52 upwardly into intake or downtake 47. The raw water, together with the softening reagent, passes downwardly into the downtake 47 and upwardly in the uptake 48, the air from nozzle-pipe 52 passing upwardly into the descending stream of water in the downtake and bubbling through the same, so as to more effectually commingle and distribute the reagent with the water. From the top of the uptake 48 the water passes downwardly in the downtake 49 and under the bottom lip thereof and upwardly around in the space between the same and the casing 1, finally overflowing through pipe 9 to the usual tank or reservoir. Air is also discharged through the pipe 53 outwardly against the rising stream or current in the final uptake between the casing 1 and the pipe 49, the downward pressure of this air serving to hold back or resist the upward passage of finely-divided sediment. The air blown through the water from pipes 52 53 also serves to blow off gaseous impurities and to purify the water by oxidation. As the water passes into conduits within the pipes 47 48 49 and casing 1 of successively greater cross-section its velocity continually decreases, and in descending and ascending inside and outside of pipe 49 its velocity is slackened sufficiently to enable it to deposit the sediment and precipitates, this action being aided by the downward pressure of the air from pipe 53. The sludge or precipitate accumulates on the floor 4, which inclines toward the outlet-valve 5, so that by opening said valve the sludge may be drawn off from time to time and runs away through the drain 3.

What I claim is—

1. A water-softening apparatus comprising a tank, a casing above said tank and communicating therewith, said casing having a water-inlet, a drum mounted to revolve in said casing and provided with buckets in the path of the water from the inlet, a reagent-supply connection to said drum, valves on said drum controlling the passage of the reagent-supply from the drum into the casing and tank, and operating means in the path of movement of the valves to operate the valves in the movement of the drum.

2. A water-softening apparatus comprising a tank, a casing above said tank and communicating therewith, said casing having a water-inlet, a drum mounted to revolve in said casing and provided with buckets in the path of the water from the inlet, a reagent-supply connection to said drum, valves on said drum controlling the passage of the reagent-supply from the drum into the casing and tank, and operating means in the path of movement of the valves to operate the valves in the movement of the drum, said operating means being adjustable to vary the extent of opening of the valves.

3. A water softening and clarifying apparatus comprising a tank having an overflow-outlet, a top extending above the tank, a casing on said top, water and reagent supply means in said casing, a downward intake extending from the top into the tank and communicating with the casing to receive the water and reagent, an uptake surrounding said intake and closed at the bottom and extending to near the top of the tank, a downtake-pipe surrounding said uptake and extending toward the bottom of the tank, the space between said downtake and the tank-wall forming an uptake leading to the overflow-outlet, and air-supply means at the bottom of the intake to discharge water thereinto, the casing at the top of the intake having an opening for the exit of air therefrom.

4. A water softening and clarifying apparatus comprising a tank having an overflow-outlet in its wall, a top extending above the tank, a casing on said top, water and reagent supply means in said casing, a downward intake extending from the top into the tank and communicating with the casing to receive the water and reagent, an uptake surrounding said intake and closed at the bottom and extending to near the top of the tank, a downtake-pipe surrounding said uptake and extending toward the bottom of the tank, the space between said downtake and the tank-wall forming an uptake leading to the overflow outlet, and a downwardly-directed air-supply means in said last-named uptake, the tank having an opening at its upper part for the exit of air.

In testimony whereof I have hereunto set my hand, at Los Angeles, California, this 21st day of February, 1906.

JOHN L. ZEIGLER.

In presence of—
ARTHUR P. KNIGHT,
VERNA A. TALBERT.